United States Patent [19]
Ishizuka et al.

[11] Patent Number: 4,979,826
[45] Date of Patent: Dec. 25, 1990

[54] DISPLACEMENT MEASURING APPARATUS

[75] Inventors: Koh Ishizuka, Urawa; Tetsuharu Nishimura, Kawasaki; Masaaki Tsukiji; Satoshi Ishii, both of Tokyo; Yoichi Kubota, Kawasaki, all of Japan

[73] Assignee: Canon Kabushiki Kaisha, Tokyo, Japan

[21] Appl. No.: 380,038

[22] Filed: Jul. 14, 1989

[30] Foreign Application Priority Data

Jul. 19, 1988 [JP] Japan .................. 63-181151

[51] Int. Cl.$^5$ ............................................. G01B 9/02
[52] U.S. Cl. ................................. 356/356; 356/363; 250/237 G; 250/231.16
[58] Field of Search ............... 356/356, 358, 363, 401; 250/237 G, 231.14, 231.16

[56] References Cited

U.S. PATENT DOCUMENTS 4,676,645  6/1987  Taniguchi et al. .................. 356/356
4,728,193  3/1988  Bantelt et al. ...................... 356/356

FOREIGN PATENT DOCUMENTS 63-75518  4/1988  Japan .

Primary Examiner—Vincent P. McGraw
Assistant Examiner—S. A. Turner
Attorney, Agent, or Firm—Fitzpatrick, Cella, Harper & Scinto

[57] ABSTRACT

A displacement measuring apparatus has an illuminating device for illuminating a diffraction grating with a radiation beam, an optical system for directing first and second diffracted beams created by the diffraction grating with to the diffraction grating, the optical system being provided so that the first and second diffracted beams have a common optical path and travel in opposite directions along the optical path. In addition, a device receives an interference beam formed by first and second re-diffracted beams created by the first and second diffracted beams being diffracted by the diffraction grating, and outputs a signal conforming to the displacement of the diffraction grating relative to the radiation beam.

22 Claims, 11 Drawing Sheets

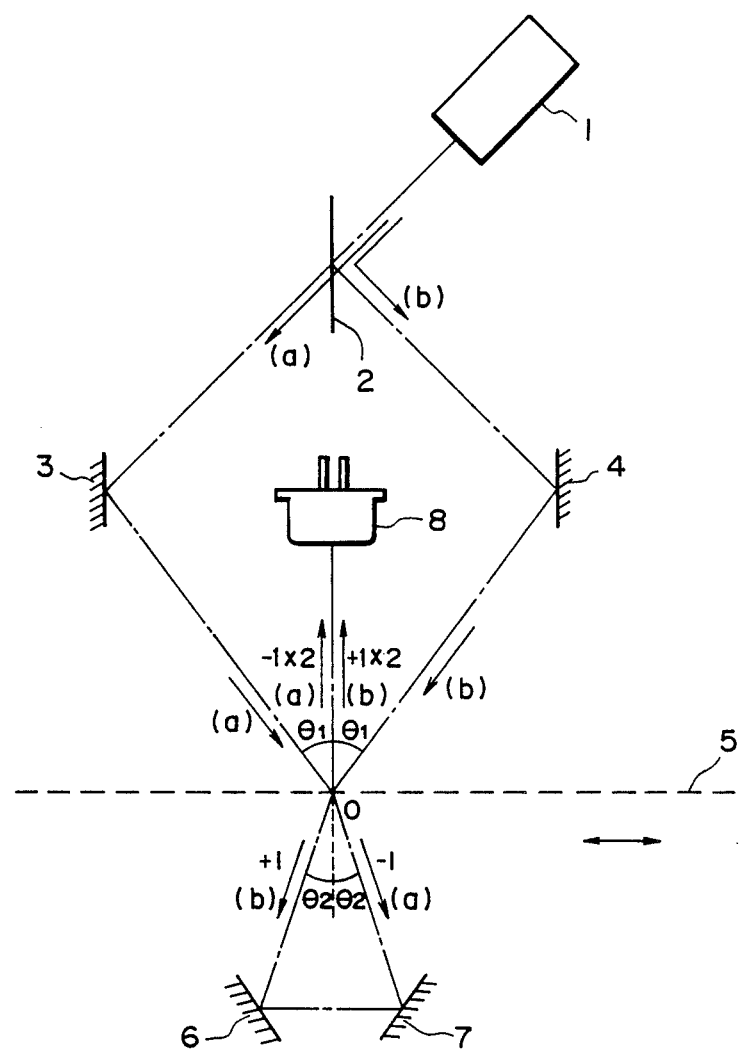
F I G. 2

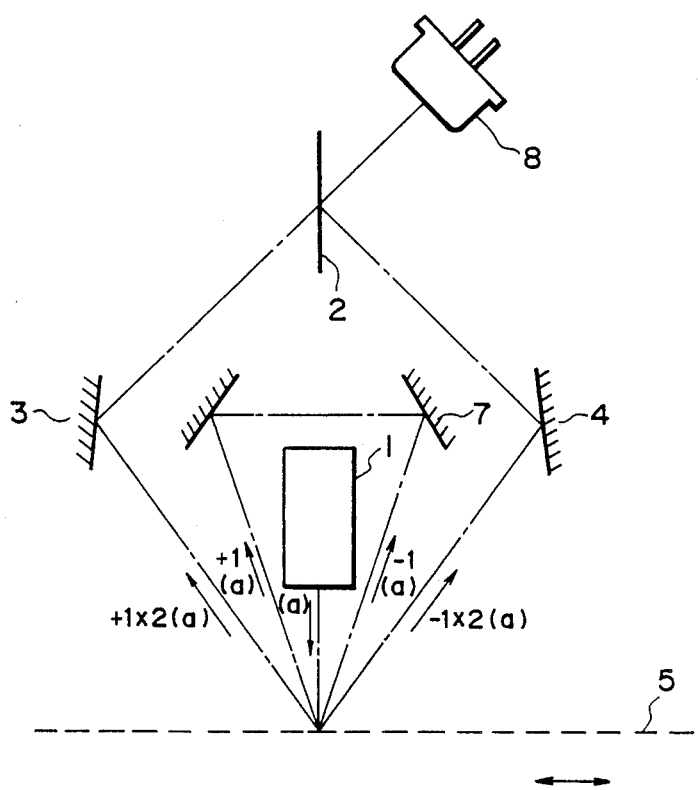
F I G. 7

DISPLACEMENT MEASURING APPARATUS

BACKGROUND OF THE INVENTION

1. Field of the Invention

This invention relates to a displacement measuring apparatus, and in particular to a displacement measuring apparatus for measuring the displacement of an optical type scale on the basis of an interference signal obtained by causing diffracted lights emerging from a diffraction grating formed on the optical type scale to interfere with each other.

2. Related Background Art

As a method of measuring the displacement of an object to be examined with a resolving power and accuracy of the order of microns or submicrons, there is known an encoder in which a monochromatic coherent light beam is caused to enter a diffraction grating moving relative to a reading head. ±1st-order diffracted lights of diffracted lights created by the diffraction grating are taken out and these diffracted lights are superposed one upon the other to thereby form an interference light, and this interference light is received by a light receiving sensor. The the displacement of the diffraction grating is measured on the basis of the periodic output signal from the light receiving sensor.

FIG. 1A of the accompanying drawings shows an encoder of this type described in Japanese Laid-Open patent application No. 63-75518. A monochromatic parallel light emitted from a light source 1 is divided into two light beams (a) and (b) by a beam splitter 2, and the light beams (a) and (b) enter target points P and Q on a difraction grating 5 at a particular angle $\theta_1$ from opposite directions. The +1st-order diffracted light created at the point P and the −1st-order diffracted light created at the point Q are mirror-reflected by points M1 and M2 on a mirror surface 51 formed by evaporating a metal film or the like on the back of a glass scale plate 50 having the diffraction grating 5 formed on the upper surface thereof, and again enter a point R on the diffraction grating 5 at an angle $\theta_2$. The light beam subjected to +1st-order diffraction at the point P is again subjected to +1st-order diffraction on the diffraction grating 5, and the light beam subjected to −1st-order diffraction at the point Q is again subjected to −1st-order diffraction on the diffraction grating 5. These ±1st-order rediffracted lights have their optical paths superposed one upon the other and emerge perpendicularly from the diffraction grating 5, and enter light receiving sensors 8A and 8B as interference light beams via a quarter wavelength plate 9, a polarizing beam splitter 12 and polarizing plates 11A and 11B.

FIG. 1B of the accompanying drawings shows an encoder described in U.S. Pat. No. 4,606,645. A monochromatic parallel light emitted from a light source 1 is divided into two light beams (a) and (b) by a beam splitter 2, and the light beams (a) and (b) enter target points P and Q on a diffraction grating 5 at a particular angle $\theta_1$ from opposite directions. The +1st-order diffracted light created at the point P and the −1st-order diffracted light created at the point Q are mirror-reflected by reflecting mirrors M1 and M2, respectively, and again follow the same optical paths to return to the diffraction grating 5 and enter the points P and Q at an angle $\theta_2$ and are re-diffracted. The ±1st-order re-diffracted lights re-diffracted at the target points P and Q on the diffraction grating 5 travel back along the original optical paths and are superposed one upon the other by the beam splitter 2, and enter a light receiving element 8 as an interference light beam.

In such prior-art encoders, the optical path until the +1st-order diffracted light is re-diffracted differs from the otpical path until the −1st-order diffracted light is re-diffracted and therefore, where use is made of a scale having a diffraction grating formed on a glass substrate, if the thickness and refractive index of the glass substrate are irregular, the difference between the lengths of the optical paths of the +1st-order diffracted light and the −1st-order diffracted light varies in conformity with the detected position of the scale. Accordingly, a change in phase occurs between the diffracted lights passing along the optical paths and this provides a measurement error.

SUMMARY OF THE INVENTION

It is an object of the present invention to eliminate the above-noted disadvantage peculiar to the prior art and to provide a displacement measuring apparatus which is small in measurement error.

To achieve the above object, the displacement measuring apparatus according to the present invention is a displacement measuring apparatus in which a light beam is caused to enter a diffraction grating formed on an optical type scale and first and second diffracted lights created by said diffraction grating are caused to re-enter said diffraction grating and are diffracted. An interference light formed by first and second re-diffracted lights emerging from said diffraction grating is directed to a photodetector and the displacement of said optical type scale is measured on the basis of a variation in the output signal from said photodetector. The diffraction grating is disposed so that the optical paths of said first and second diffracted lights are common to each other and that said first and second diffracted lights travel in opposite directions.

Further features and specific forms of the present invention are described in the following description of some embodiments of the invention.

BRIEF DESCRIPTION OF THE DRAWINGS

FIG. 2 shows the construction of a first embodiment of the present invention.

FIGS. 6 and 7 show the construction when the diffraction gratings in the first and second embodiments are of the reflection type.

DESCRIPTION OF THE PREFERRED EMBODIMENTS

Figure 1A:
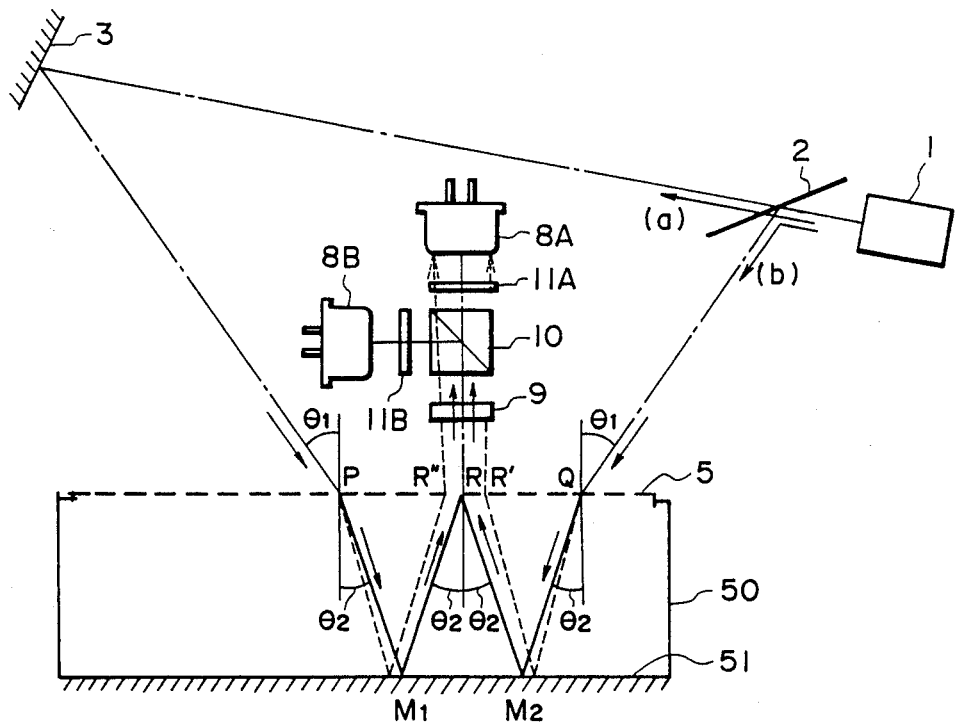
FIGS. 1A and 1B illustrate displacement measuring apparatuses according to the prior art.
Figure 1B:
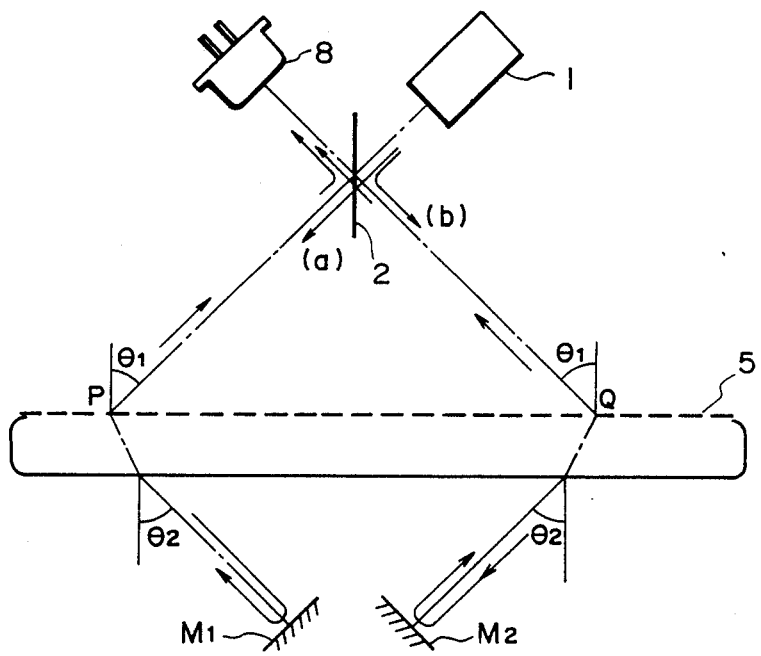
Figure 3:
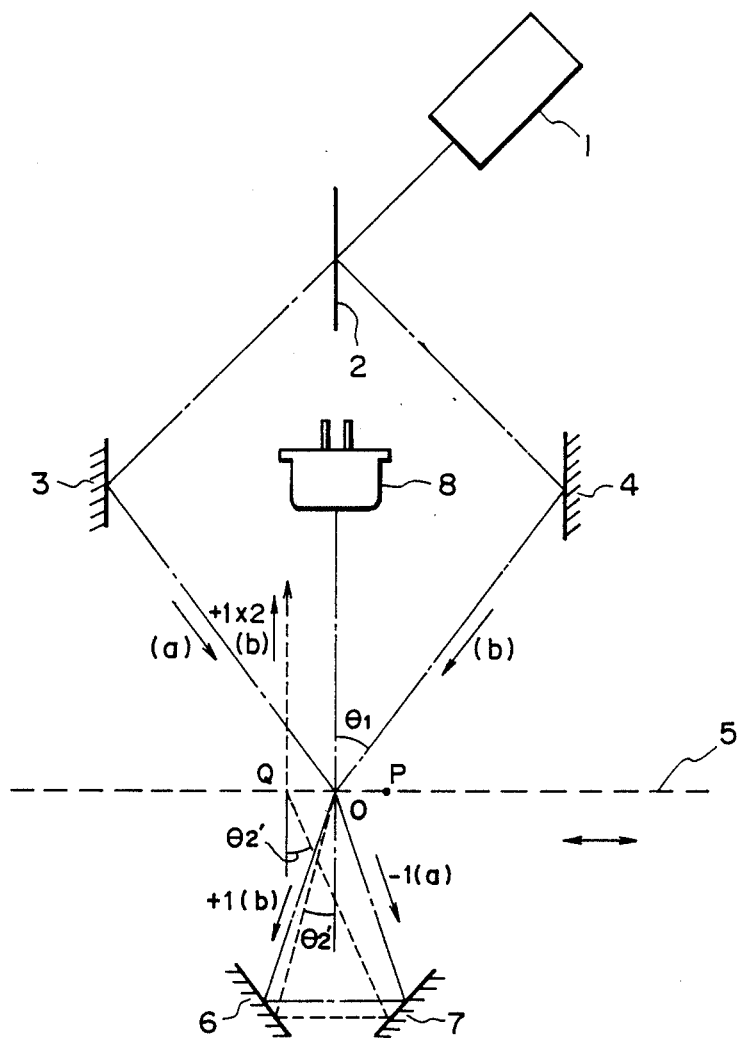
FIG. 3 shows the influence of a variation in the wavelength of a light from a light source in the first embodiment upon the apparatus.

The displacement measuring apparatus of the present invention will hereinafter be described in detail, and in order to make clear the kinds of diffracted lights created by a diffraction grating, the following symbols will be used in the drawings and description:

(1) −1(a): −1st-order diffracted light created by a light beam (a) being once diffracted by a diffraction grating (2) −1×2(a): −1st-order (re-)diffracted light created by the diffracted light −1(a) being further diffracted by the diffraction grating (3) +1(b): +1st-order diffracted light created by a light beam (b) being once diffracted by the diffraction grating (4) +1×2(b): +1st-order (re-)diffracted light created by the diffracted light +1(b) being further diffracted by the diffraction grating (5) +1(a): +1st-order diffracted light created by the light beam (a) being once diffracted by the diffraction grating (6) +1×2(a): +1st-order re-diffracted light created by the diffracted light +1(a) being further diffracted by the diffraction grating FIGS. 2 and 3 are schematic views showing a first embodiment of the present invention.

In FIGS. 2 and 3, a diffraction grating 5 acts as an optical type scale, and the diffraction grating 5 of the amplitude type is formed by evaporating chromium or the like on a glass substrate and forming a grating pattern thereon. This scale is mounted on an object to be examined such as a movable stage and is translated in the direction of arrow in the figures. Accordingly, the displacement measuring apparatus of FIGS. 2 and 3 is used as a linear encoder.

In FIG. 2, a light beam emitted from a monochromatic light source (for example, a semiconductor laser) which emits a coherent light beam is divided into two by a beam splitter 2. The light beam (a) transmitted through the beam splitter 2 is reflected by a mirror 3 and enters a point 0 on the diffraction grating 5 at an angle of incidence $\theta_1$, and the light beam (b) reflected by the beam splitter 2 is reflected by a mirror 4 and enters the point 0 at an angle of incidence $\theta_1$ like the light beam (a). The −1st-order diffracted light −1(a) by the light beam (a) emerges from the diffraction grating 5 at an angle $\theta_2$, is reflected by a mirror 7 and is directed to a mirror 6. Subsequently, this light beam −1(a) is reflected by the mirror 6 and is returned to the point 0. The +1st-order diffracted light +1(b) by the light beam (b) emerges from the diffraction grating 5 at an angle $\theta_2$, is reflected by the mirror 6 and is directed to the mirror 7. Subsequently, this light beam +1(b) is reflected by the mirror 7 and is returned to the point 0. The reflecting optical system comprising the mirrors 6 and 7 is disposed so that the two light beams −1(a) and +1(b) travel in opposite directions on a common optical path and re-enter the point 0 at an angle $\theta_2$.

The light beam −1(a) is again diffracted as −1st-order diffracted light, whereby it becomes the re-diffracted light −1×2(a) which emerges from the point 0 on the diffraction grating 5 perpendicularly to the grating surface of the diffraction grating 5. Also, the light beam +1(b) is again diffracted as +1st-order diffracted light, whereby it becomes the re-diffracted light +1×2(b) which emerges from the point 0 on the diffraction grating perpendicularly to the grating surface of the diffraction grating 5. The light beam −1×2(a) and the light beam +1×2(b) emerge in the same direction from the common point 0 and their optical paths overlap each other and therefore, these light beams interfere with each other and provide an interference light which enters a light receiving sensor 8. The light beam −1×2(a) is twice subjected to −1st-order diffraction and therefore, the phase thereof per the amount of relative movement x of the diffraction grating 5 in the direction of arrow is delayed by $\phi_a$. This may be mathematically expressed as follows:

$$\phi_a = 2\pi \times \frac{x}{p} \times 2,$$

where p represents the grating pitch of the diffraction grating 5 which is indicated in the same unit system as the amount of movement x. Likewise, the phase of the light beam +1×2(b) is advanced by $\phi_b$ per the amount of relative movement x of the diffraction grating 5. Accordingly, this can be expressed by the equation $$\phi_b = 2\pi \times \frac{x}{p} \times 2.$$

When the two beams −1×2(a) and +1×2(b) are caused to interfere with each other, a sine wave signal of period 4x/p is obtained from the light receiving sensor 8.

In the present embodiment, even if the diffraction grating 5 is formed on a glass substrate of irregular thickness, the optical path of the +1st-order diffracted light +1(b) and the optical path of the −1st-order diffracted light −1(a) are common to each other and therefore, even if the thickness of the glass substrate for these two light beams varies with the displacement of the diffraction grating 5, it will not affect the phase difference between the two light beams. Also, the variation in the phase difference between the two light beams caused by a variation in the environmental temperature is small. Accordingly, displacement measurement which is small in measurement error can be accomplished.

Also, in the present embodiment, the optical paths of the light beam −1(a) and the light beam +1(b) are set by the use of two mirrors and therefore, as shown in FIG. 3, the wavelength of the light from the light source fluctuates with the fluctuation of the environmental temperature or the like and as a result, the angle of diffraction changes from $\theta_2$ to $\theta_2'$ and the optical paths deviate as indicated by the dotted lines. Note that FIG. 3 exaggerates the deviation of the optical paths. Therefore, the point P at which the light beam −1(a) re-enters the diffraction grating 5 and the point Q at which the light beam +1(b) re-enters the diffraction grating 5 slightly deviate as shown. However, since the angles of reincidence of the light beams −1(a) and +1(b) onto the diffraction grating 5 are $\theta_2'$, the re-diffracted lights −1×2(a) and +1×2(b) emerge perpendicularly to the grating surface of the diffraction grating 5. Accordingly, if the optical paths of the light beam −1(a) and the light beam +1(b) are set to short, the deviation of the optical paths will hardly pose a problem. Even if the wavelength of the light from the light source varies and the angle of diffraction varies, there occurs no angle difference between the angles of emergence from the diffraction grating 5 of the re-diffracted lights −1×2(b) and +1×2(a) which are caused to interfere with each other and therefore, it is difficult for a reduction in the amplitude of an interference signal obtained in the light receiving sensor 8 to occur.

Figure 4:
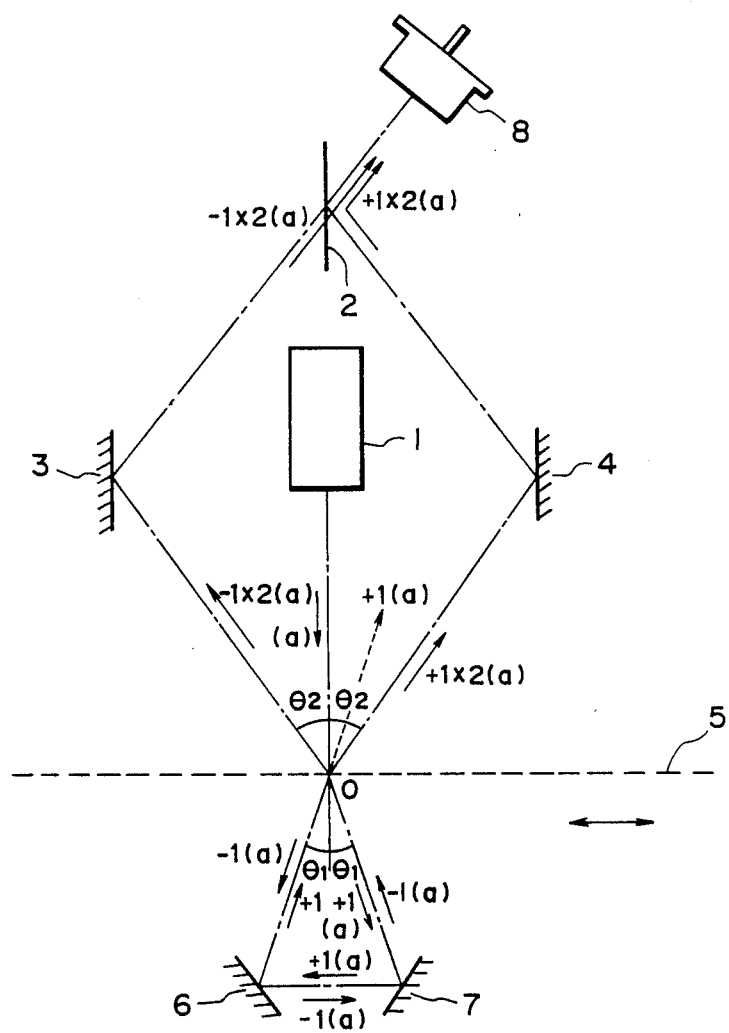
FIG. 4 shows the construction of a second embodiment of the present invention.
Figure 5:
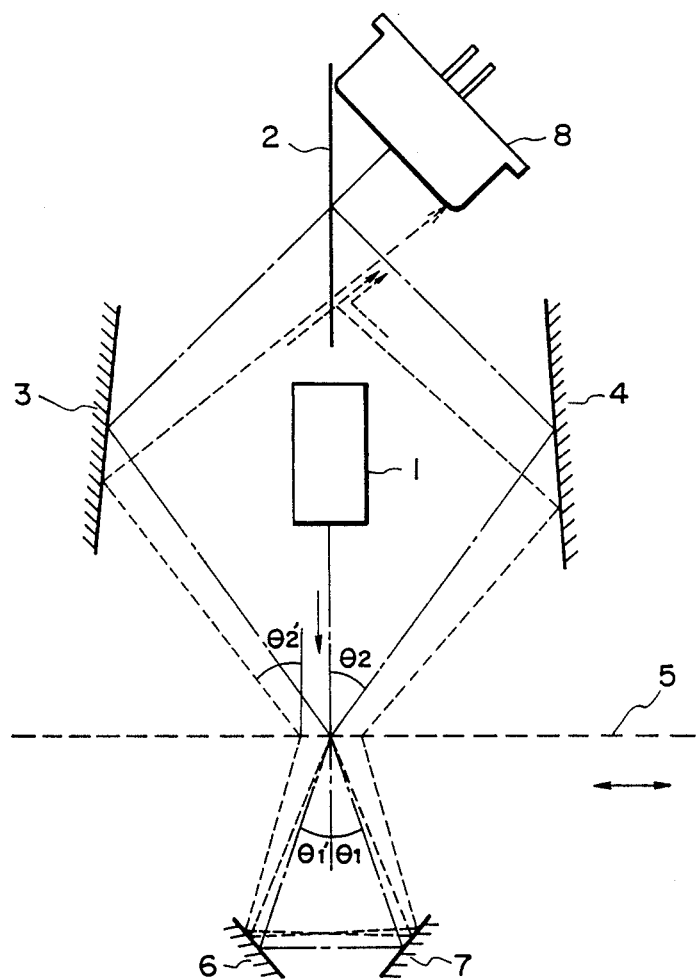
FIG. 5 illustrates the influence of a variation in the wavelength of a light from a light source in the second embodiment.

FIGS. 4 and 5 illustrate a second embodiment of the present invention.

In FIG. 4, a parallel light beam (a) emitted from a monochromatic light source 1 enters a point 0 on a diffraction grating 5 perpendicularly to the grating surface thereof. The +1st-order diffracted light +1(a) created by the diffraction grating 5 emerges from the diffraction grating 5 at an angle $\theta_1$, is reflected by a mirror 7 and is directed to a mirror 6. Then it is reflected by the mirror 6, whereafter it is returned to the point 0. The −1st-order diffracted light −1(a) created by the diffraction grating 5 emerges from the diffraction grating 5 at an angle $\theta_1$, is reflected by the mirror 6 and is directed to the mirror 7. Then it is reflected by the mirror 7, whereafter it is returned to the point 0. That is, the two light beams 1(a) and −1(a) are caused to travel in opposite directions along a common optical path by the reflecting optical system comprising the mirror 6 and the mirror 7 and re-enter the point 0 at the angle $\theta_1$.

The light beam −1(a) is again subjected to −1st-order diffraction by the diffraction grating 5 and becomes a light beam −1×2(a) which emerges from the point 0 at an angle $\theta_2$ relative to the direction of the normal to the grating surface of the diffraction grating 5. On the other hand, the light beam +1(a) is again subjected to +1st-order diffraction by the diffraction grating 5 and becomes a light beam +1×2(a) which emerges from the point 0 at an angle $\theta_2$ relative to the direction of the normal to the grating surface of the diffraction grating 5. The two re-diffracted lights −1×2(a) and +1×2(a) emerge at an angle $\theta_2$ in opposite directions with the normal to the grating surface of the diffraction grating 5 intervening therebetween, and the light beam +1×2(a) is directed to a beam splitter 2 via a mirror 4, and the light beam −1×2(a) is directed to the beam splitter 2 via a mirror 3. These light beams have their optical paths superposed one upon the other by the beam splitter 2 and enter a light receiving sensor 8 as an interference light.

Again in the present embodiment, as in the previous embodiment, the optical paths of two diffracted lights (the optical paths until the lights are once diffracted and again diffracted) are made common to each other by the reflecting optical system comprising the mirror 6 and the mirror 7 and therefore, measurement error becomes small.

Also in the present embodiment, as shown in FIG. 5, the wavelength of the light from the light source fluctuates with the fluctuation of the environmental temperature or the like and as a result, the angles of diffraction of the diffracted lights change from $\theta_1$ to $\theta_{1'}$ and from $\theta_2$ to $\theta_{2'}$ and the optical paths deviate as indicated by dotted lines. (Note that FIG. 5 exaggerates the deviation of the optical paths). However, since the optical paths of the re-diffracted lights +1×2(a) and −1×2(a) deviate symmetrically relative to the normal to the diffraction grating surface passing through the point 0, two light beams emerging from a beam splitter 9 always remain superposed one upon the other. Generally, if the optical paths are made shorter, the positional deviation of the incident light beam will become negligibly small as compared with the size of the light receiving surface of the light receiving sensor and therefore, even if the angle of diffraction is varied by a variation in the wavelength of the light from the light source, the amplitude of an interference signal obtained in the light receiving sensor 8 will not be reduced.

In the present embodiment, the +1st-order diffracted light +1(a) and the −1st-order diffracted light −1(a) are obtained from a single light beam at first, and this leads to the feature that the intensity of the interference light becomes twice as great as that in the previous embodiment.

Figure 6:
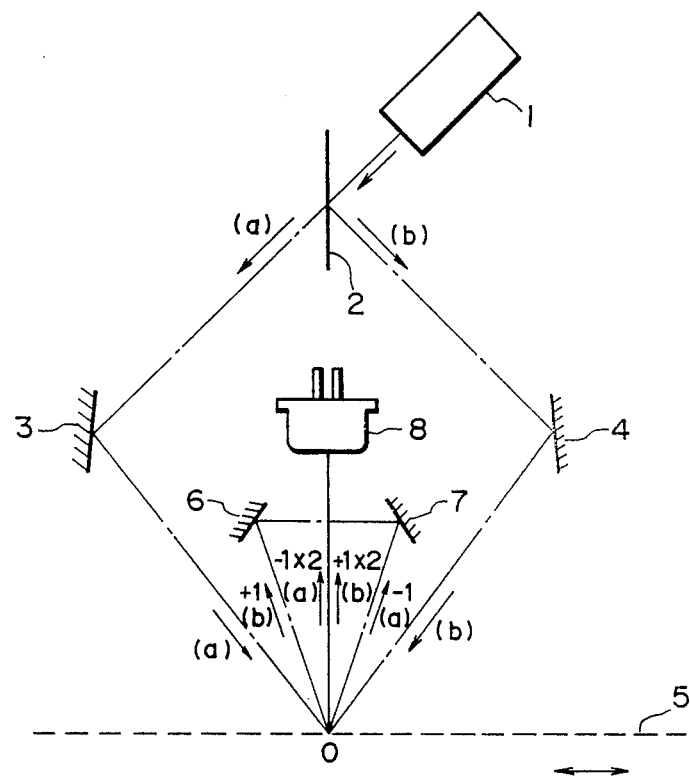

The displacement measuring apparatus shown in the first and second embodiments are of the type in which an interference light is formed by the use of transmitted diffracted light, but a construction in which an interference light is formed by the use of reflected diffracted light can also be realized as shown, for example, in FIGS. 6 and 7. The embodiment shown in FIGS. 6 and 7 is of the same construction as the aforedescribed first and second embodiments with the exception that the reflecting optical system comprising the mirror 6 and the mirror 7 is provided on the light source 8 side, and the measurement principle thereof is also the same as that of the aforedescribed embodiments. Accordingly, the construction and operation of the apparatus shown in FIGS. 6 and 7 need not be described in detail.

One of the functions of a displacement measuring apparatus such as a linear encoder or a rotary encoder is to discriminate the direction of displacement of an object to be examined, i.e., the direction of displacement of an optical type scale. For the purpose of such discrimination of the direction, it has heretofore been practised to obtain signals of two phases having a phase difference (e.g. 90°) by the use of the light signal from the optical type scale.

This is readily accomplished by the utilization of the polarization characteristic of the light signal. In the embodiments shown below, there is shown an apparatus capable of discriminating the direction of movement of the diffraction grating 5 as well.

Figure 8:
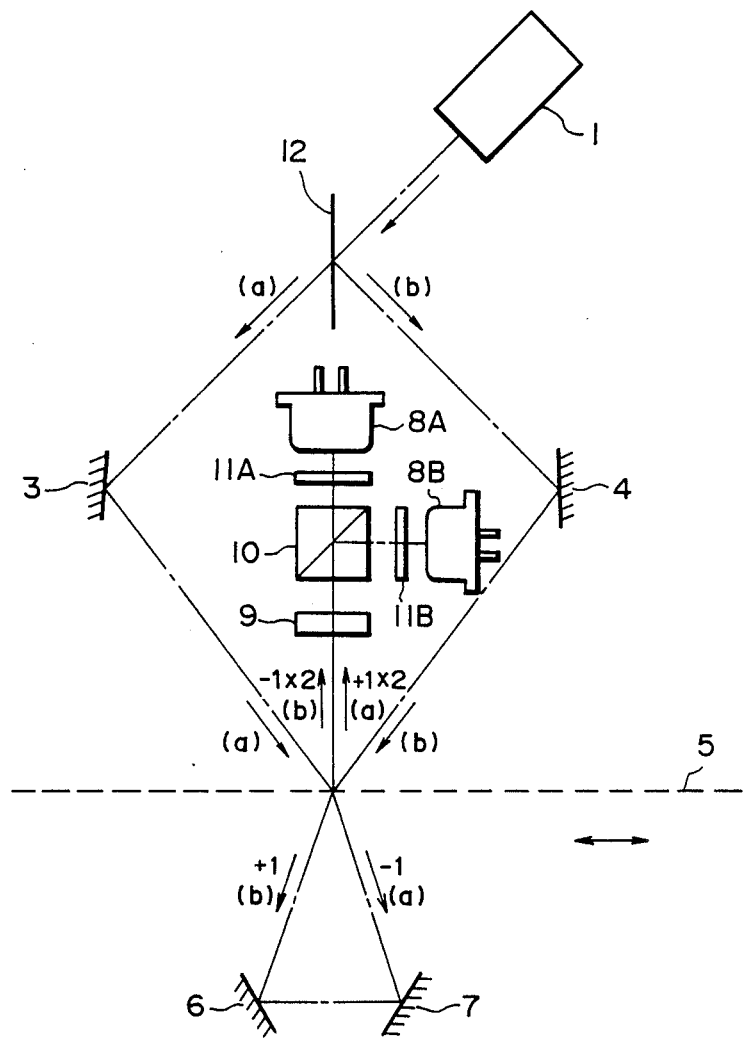
FIGS. 8 to 10 show the constructions of modifications of the first and second embodiments.

FIG. 8 shows a modification of the FIG. 2 embodiment, and the basic construction thereof does not differ from that of the apparatus of FIG. 2. A monochromatic parallel light beam from a light source 1 is divided into P-polarized light (a) and S-polarized light (b) by a polarizing beam splitter 12, whereafter the two light beams are twice diffracted by a diffraction grating 5 by the use of a reflecting optical system 3, 4, 6, 7, and the P-polarized light −1×2(a) is caused to enter a quarter wavelength plate 9 while remaining P-polarized light, and the S-polarized light +1×2(b) interfering with the P-polarized light (a) is caused to enter the quarter wavelength plate 9 while remaining to be S-polarized light, and they are made into circularly polarized lights rotating in opposite directions through the quarter wavelength plate 9. The interference light resulting from these light beams being superposed one upon the other becomes a rectilinearly polarized light whose polarization azimuth changes in conformity with the phase difference between the light beams −1×2(a) and +1×2(b) (i.e., in conformity with the displacement of the diffraction grating 5). Thereafter, the interference light is divided into two light beams by a non-polarizing beam splitter 10, and one of the two light beams is transmitted through a polarizing plate 11A and the other light beam is transmitted through a polarizing plate 11B whose polarization azimuth is deviated by 45° relative to the polarization azimuth of the polarizing plate 11A. The interference light beams then enter light receiving sensors 8A and 8B, respectively, to which they correspond. Thus, sine wave signals having a phase difference of 90° therebetween are obtained from the light receiving sensors 8A and 8B, and the direction of movement of the diffraction grating 5 can be detected on the basis of the phase relation between the sine wave signals from the light receiving sensors 8A and 8B.

Figure 9:
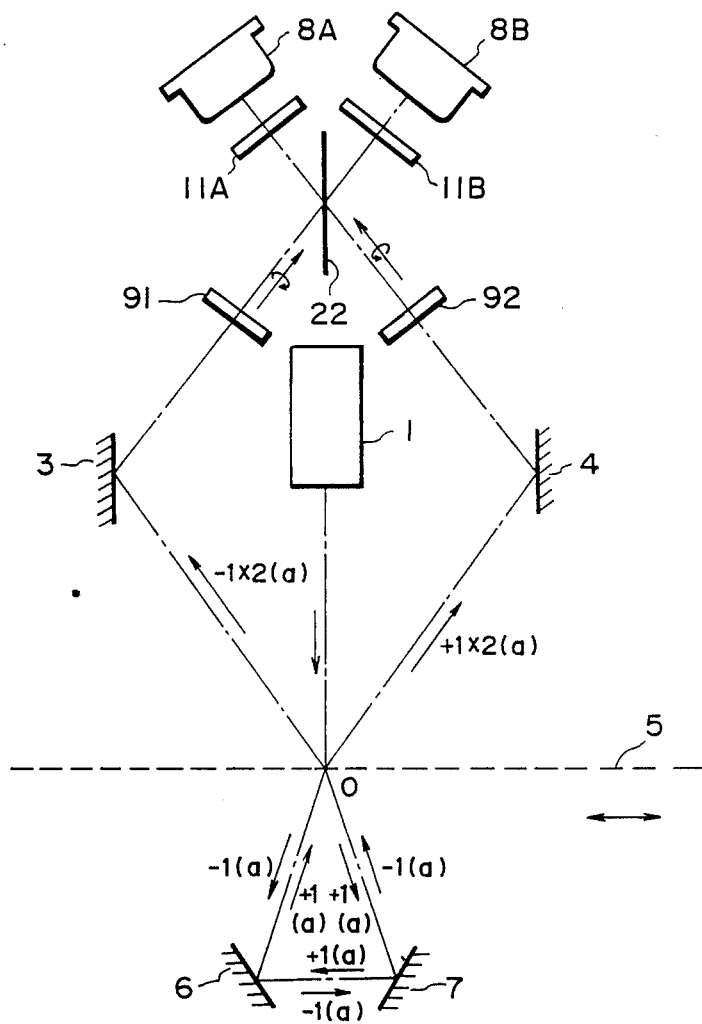

FIG. 9 shows a modification of the FIG. 4 embodiment, and the basic construction thereof does not differ from that of the apparatus of FIG. 4. A rectilinearly polarized monochromatic parallel light emitted from a light source 1 enters a diffraction grating 5, and is made into a light beam $-1\times 2(a)$ twice subjected to $-1$st-order diffraction and a light beam $+1\times 2(a)$ twice subjected to $+1$st-order diffraction, by a reflecting optical system 6, 7. By means of a reflecting mirror 3, the re-diffracted light $-1\times 2(a)$ is transmitted through a quarter wavelength plate 91, and by means of a reflecting mirror 4, the re-diffracted light $+1\times 2(a)$ is transmitted through a quarter wavelength plate 92 whose optic axis is deviated by 90° relative to the optic axis of the quarter wavelength plate 91, and they are made into circularly polarized lights rotating in opposite directions. Accordingly, when the two light beams $-1\times 2(a)$ and $+1\times 2(a)$ are superposed one upon the other by a non-polarizing beam splitter 22, there can be taken out interference light beams in which the two light beams interfere with each other in two directions. Each interference light beam becomes a rectilinearly polarized light whose polarization azimuth is changed in conformity with the phase difference between the circularly polarized lights rotating in opposite directions, i.e., the phase difference between the light beams $-1\times 2(a)$ and $+1\times 2(a)$. Thereafter, as in the embodiment of FIG. 8, the interference light beams are transmitted through the polarizing plates 11A and 11B, respectively, and enter corresponding light receiving sensors 8A and 8B, respectively.

Figure 10:
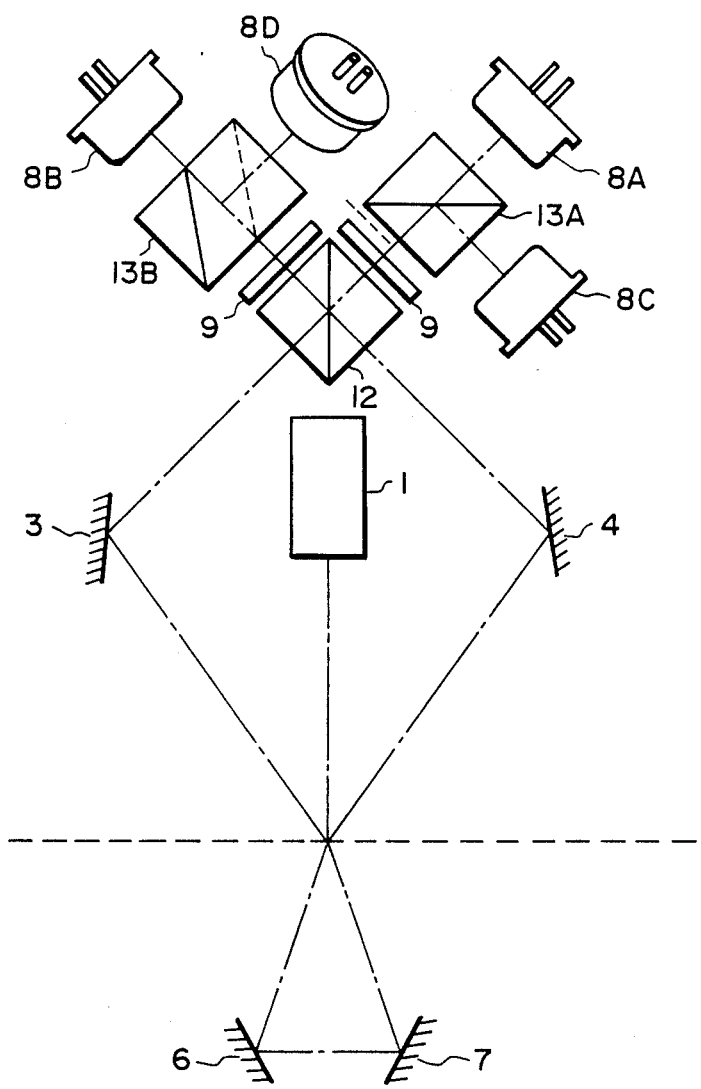

FIG. 10 shows a modification of the FIG. 9 embodiment. This modification is an embodiment in which instead of the quarter wavelength plates 91 and 92 of FIG. 9, a quarter wavelength plate 9 is provided in the optical path of each interference light and a polarizing beam splitter 13A instead of the polarizing plate 11A and a polarizing beam splitter 13B instead of the polarizing plate 11B are mounted as they are rotated relative to each other by 45° about the optic axis, whereby four out-of-phase signals which are 90° out of phase with one another are obtained from light receiving elements 8A-8D.

Figure 11:
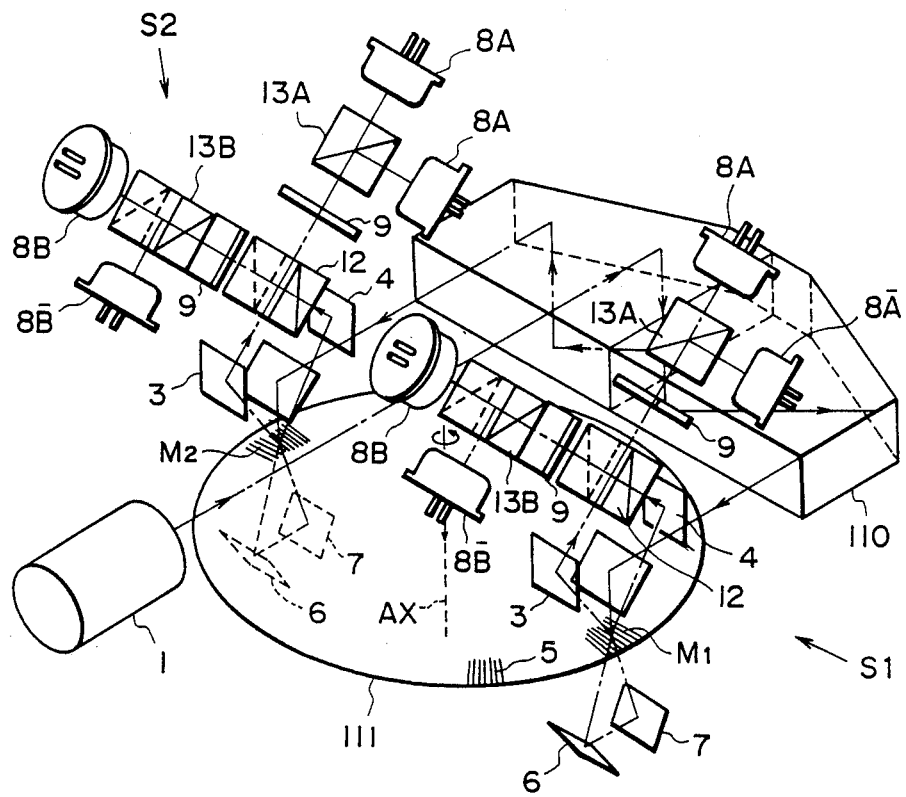
FIG. 11 shows the construction of a rotary encoder constructed by the use of two sets of optical systems shown in FIG. 10.

FIG. 11 shows an embodiment in which two detecting optical systems S1 and S2 having the construction of the FIG. 10 embodiment are used to apply the present invention to a rotary encoder. The light beam from a multimode semiconductor laser 1 is collimated by a collimator lens, not shown, and is thereafter divided into two light beams by a beam splitter prism 110, and the two light beams are supplied to the detecting optical systems S1 and S2 disposed at positions point-symmetrical with respect to the axis of rotation AX of a rotatable disc 111. These detecting optical systems direct the respective light beams to points M1 and M2 on the diffraction grating 5 which are point-symmetrical relative to each other with respect to the axis of rotation AX, and the displacement of the diffraction grating (the angle of rotation of the disc) is measured on the basis of the aforedescribed principle.

The degrees of the diffracted lights used in the above-described embodiments are all ±1st-orders, but generally mth-order and nth-order ($m\neq n$) diffracted lights can be used and of course, ±mth-orders ($m=1, 2, \ldots$) may also be used.

As the diffraction grating, a phase type diffraction grating comprising a relief grating or a hologram can be used besides the aforedescribed amplitude type diffraction grating. Also, in some of the above-described embodiments, two light beams have been caused to enter substantially the same point on the diffraction grating, but alternatively, design may be made such that the two light beams are caused to enter positions spaced apart from each other.

As described above, design is made such that the optical paths of the first and second diffracted lights emerging from the movable diffraction grating are common to each other and the two diffracted lights travel in opposite directions. The first and second diffracted lights enter the diffraction grating again and are re-diffracted thereby and an interference light formed by the first and second re-diffracted lights is directed to the photodetector. In this manner, measurement accuracy does not deteriorate even if there are variations in the thickness and refractive index of the glass substrate on which the diffraction grating is formed, i.e., the optical type scale itself. Also, the fact that the lengths of the optical paths of the first and second diffracted lights are not varied by any variation in the environmental temperature is also effective to prevent the deterioration of measurement accuracy.

What is claimed is:

1. A displacement measuring apparatus having:
    illuminating means for illuminating a diffraction grating with a radiation beam;
    an optical system for directing first and second diffracted beams created by said diffraction grating to said diffraction grating, said optical system being provided so that said first and second diffracted beams have a common optical path and travel in opposite directions along said optical path; and
    means for receiving an interference beam formed by first and second re-diffracted beams created by said first and second diffracted beams being diffracted by said diffraction grating, and outputting a signal conforming to the displacement of said diffraction grating relative to said radiation beam.

2. A displacement measuring apparatus according to claim 1, wherein said illuminating means directs said radiation beam to said diffraction grating so that said first and second diffracted beams emerge from substantially the same location on said diffraction grating.

3. A displacement measuring apparatus according to claim 2, wherein said illuminating means is designed to direct first and second radiation beams to said location on said diffraction grating, said first radiation beam is diffracted to thereby create said first diffracted beam, and said second radiation beam is diffracted to thereby create said second diffracted beam.

4. A displacement measuring apparatus according to claim 2, wherein said illuminating means is designed to direct a single radiation beam to said location on said diffraction grating, and said radiation beam is diffracted to thereby create said first and second diffracted beams.

5. A displacement measuring apparatus according to claim 1, wherein said optical system has a plurality of reflecting mirrors cooperating with one another to define said optical path.

6. A displacement measuring apparatus according to claim 1, wherein said illuminating means has a semiconductor laser for supplying said radiation beam.

7. A displacement measuring method, comprising the steps of:

directing a radiation beam to a diffraction grating;

causing first and second diffracted beams created by said diffraction grating to travel in opposite directions through and along a common optical path and directing said first and second diffracted beams to said diffraction grating to thereby form first and second re-diffracted beams; and receiving an interference beam formed by said first and second re-diffracted beams and measuring the displacement of said diffraction grating relative to said radiation beam.

8. A displacement measuring method according to claim 7, wherein said step of directing a radiation beam comprises causing first and second radiation beams to enter a predetermined location on said diffraction grating so that said first diffracted beam is formed by said first radiation beam and said second diffracted beam is formed by said second radiation beam.

9. A displacement measuring method according to claim 7, wherein said step of directing a radiation beam comprises diffracting a single radiation beam toward said diffraction grating to thereby form said first and second diffracted beams.

10. A displacement measuring apparatus having:

means for directing a single laser beam to a predetermined location on a diffraction grating and creating first and second diffracted beams from said location;

a reflecting optical system for forming a common optical path for said first and second diffracted beams and reflecting said first and second diffracted beams toward said location so that said first and second diffracted beams travel in opposite directions along said optical path;

means for forming an interference beam by a first re-diffracted beam created by said first diffracted beam being diffracted at said location and a second rediffracted beam created by said second diffracted beam being diffracted at said location; and photoelectric converting means for photoelectrically converting said interference beam and outputting a signal conforming to the displacement of said diffraction grating.

11. A displacement measuring apparatus according to claim 10, which is designed such that said first re-diffracted beam becomes a diffracted beam twice subjected to +1st-order diffraction and said second re-diffracted beam becomes a diffracted beam twice subjected to −1st-order diffraction.

12. A displacement measuring apparatus according to claim 11, wherein said creating means has a semiconductor laser for supplying said laser beam, said laser being provided so that said laser beam enters said diffraction grating perpendicularly thereto.

13. A displacement measuring apparatus having:

means for directing first and second laser beams from different directions to substantially the same location on a diffraction grating, diffracting said first laser beam to create a first diffracted beam and diffracting said second laser beam to create a second diffracted beam in a direction differing from said first diffracted beam;

a reflecting optical system for forming a common optical path for said first and second diffracted beams, and reflecting said first and second diffracted beams toward said location so that said first and second diffracted beams travel in opposite directions along said optical path; and light receiving means for receiving an interference beam formed by a first re-diffracted beam created by said first diffracted beam being diffracted at said location and a second re-diffracted beam created by said second diffracted beam being diffracted at said location, and outputting a signal conforming to the displacement of said diffraction grating.

14. A displacement measuring apparatus according to claim 13, which is designed such that said first re-diffracted beam becomes a diffracted beam twice subjected to +1st-order diffraction and said second re-diffracted beam becomes a diffracted beam twice subjected to −1st-order diffraction.

15. A displacement measuring apparatus according to claim 14, wherein said creating means has a semiconductor laser, a beam splitter for dividing the laser beam from said laser and forming said first and second laser beams, and a projection optical system for directing the first and second laser beams from said beam splitter to said location.

16. A displacement measuring apparatus according to claim 15, wherein said reflecting optical system directs said first and second diffracted beams to said location so that said first and second re-diffracted beams emerge from said location in a mutually superposed relationship.

17. A displacement measuring apparatus according to claim 10, which is designed such that said first and second diffracted beams and said first and second rediffracted beams become beams transmitted through said diffraction grating.

18. A displacement measuring apparatus according to claim 13, which is designed such that said first and second diffracted beams and said first and second rediffracted beams become beams transmitted through said diffraction grating.

19. A displacement measuring apparatus according to claim 10, which is designed such that said first and second diffracted beams and said first and second rediffracted beams become beams reflected by said diffraction grating.

20. A displacement measuring apparatus according to claim 13, which is designed such that said first and second diffracted beams and said first and second rediffracted beams become beams reflected by said diffraction grating.

21. A displacement measuring apparatus according to claim 10, wherein said reflecting optical system and said interference means are provided so that the fluctuation of the wavelength of said laser beam does not much affect the manner in which said first and second re-diffracted beams are superposed one upon the other.

22. A displacement measuring apparatus according to claim 13, wherein said creating means and said reflecting optical system are provided so that the fluctuation of the wavelength of said laser beam does not much affect the manner in which said first and second re-diffracted beams are superposed one upon the other.

* * * * *

UNITED STATES PATENT AND TRADEMARK OFFICE
CERTIFICATE OF CORRECTION

PATENT NO. : 4,979,826

DATED : December 25, 1990

INVENTOR(S) : Koh Ishizuka, et al.

It is certified that error appears in the above-identified patent and that said Letters Patent is hereby corrected as shown below:

[57]        ABSTRACT:

Line 6, "with" should be deleted, and "grating," should read --grating, with--.

COLUMN 5:

Line 16, "beams 1(a)" should read --beams +1(a)--.

Signed and Sealed this

First Day of September, 1992

*Attest:*

DOUGLAS B. COMER

*Attesting Officer*   *Acting Commissioner of Patents and Trademarks*